US005948195A

United States Patent [19]

Thomas

[11] Patent Number: 5,948,195

[45] Date of Patent: Sep. 7, 1999

[54] PROCESS FOR RAPID MANUFACTURING MULTI-PANE GLASS WINDOWS

[75] Inventor: David M. Thomas, Westminster, Colo.

[73] Assignee: Artic Window, Inc., Arvada, Colo.

[21] Appl. No.: 08/814,244

[22] Filed: Mar. 11, 1997

[51] Int. Cl.[6] .......... B32B 31/00

[52] U.S. Cl. .......... 156/109; 156/107

[58] Field of Search .......... 156/99, 107, 109

[56] References Cited

U.S. PATENT DOCUMENTS 4,110,148 8/1978 Rocholl .......... 156/359
4,391,663 7/1983 Hutter, III .......... 156/64
4,393,105 7/1983 Kriesman .......... 428/34
4,800,693 1/1989 Karlsson et al. .......... 52/171
4,909,874 3/1990 Rueckheim .......... 156/109
4,928,448 5/1990 Phillip .......... 52/74
4,950,344 8/1990 Glover et al. .......... 156/159
5,007,217 4/1991 Glover et al. .......... 52/172
5,234,730 8/1993 Lautenschlaeger et al. .......... 428/34
5,350,469 9/1994 Lenhardt .......... 156/102
5,366,574 11/1994 Lenhardt .......... 156/102
5,454,893 10/1995 Dietz .......... 156/104

*Primary Examiner*—Francis J. Lorin
*Attorney, Agent, or Firm*—Ancel W. Lewis, Jr.

[57] ABSTRACT

A method for rapid manufacturing multi-pane insulating glass windows where cooling gas is used to cool temperature activated adhesive or sealant on pane spacers thereby reducing the assembly time for windows used to replace broken windows in emergency conditions

11 Claims, 1 Drawing Sheet

PROCESS FOR RAPID MANUFACTURING MULTI-PANE GLASS WINDOWS

BACKGROUND OF THE INVENTION

1. Field of the Invention

This invention relates to a process and apparatus for rapid manufacturing sealed multi-pane insulating glass windows for immediate installation.

2. Description of the Prior Art

Insulating sealed glass windows contain two or more panes of glass separated by a spacer near the periphery to create a gas or vacuum containing volume between the panes of glass to reduce heat transfer through the panes. The volume, when sealed, reduces heat transfer and provides sound insulation between the outer layers of glass. The spacers providing the volume between the panes are normally sealed to the glass with adhesive or sealant. The spacer may have the adhesive or sealant integral as part of the spacer. After the adhesive or sealant is activated by various methods, described below, the spacers and volume are sealed to prevent moisture from entering into the volume or the volume filled with inert gas to achieve improved insulating properties and then sealed. Normal procedures for filling with inert gas use a vacuum to remove the air prior to inserting inert gas.

If the sealant is not fully activated, early failure may result in the seal during environmental temperature extremes. The manufacturing process usually involves using combinations of heat, radiation, compression, vacuum or moisture, and ambient air cooling, all needing time from a few hours to days to complete the process.

U.S. Pat. No. 5,234,730 uses a sealant partially activated by radiation and later completed at a selected time interval. U.S. Pat. No. 5,007,217 uses a resilient spacer with pressure sensitive adhesive or sealant and a second outer sealant. U.S. Pat. No. 4,950,344 uses an ultraviolet light curable adhesive or sealant on the spacer and a second outer seal applied after the initial cure. U.S. Pat. No. 4,928,448 uses pressure of special gases between $10^{-3}$ and 200 torr pressures between panes. U.S. Pat. No. 4,909,8704 assembles a plurality of spaced glass units using pressure and no heat to mass produce products. U.S. patent uses conveyers carrying glass units and infrared heating to seal the units. The patent instructs heating methods to activate sealant and no teaching expressed for cooling after processing or a need for fast processing or installation at construction cites. U.S. Pat. No. 4,800,693 uses special gas mixtures to control radiation between panes of glass. U.S. Pat. No. 4,393,105 uses metal spacers with electrostatic bonding the spacer to glass units. U.S. Pat. No. 4,391,663 uses cycles of heating and ambient air cooling to cure sealant and is time consuming.

There is a need for rapid manufacturing custom sized windows to immediately replace broken windows due to vandalism, weather, or accidents for security, health, and safety needs. This is especially vital in colder weather. This invention provides various sized windows with a rapid process that may be accomplished in minutes rather than hours in mobile units or in a factory for immediate shipment and installation. None of the above patents is concerned with reducing the time from ordering replacement windows to installation. None of the patents teaches techniques to cool the sealant after activation to reduce manufacturing time. None of the above patents teaches using inert gas added for insulation to cool the sealant and decrease the window manufacturing time. When gasses other than air are used in the present invention assembly, the compressed gas is released inside the volume that cools and displaces the warm air, eliminating the need for vacuum as stated in the prior art to remove the air prior to inserting inert gas.

SUMMARY OF THE INVENTION

The present invention is a process to rapidly manufacture multi-pane windows having spacers between panes to allow for air or gas insulation. At least two glass panes of similar size are spaced essentially parallel to each other and separated by a spacer placed near or at the periphery of the panes forming an air space between said panes. The spacer, that may be constructed from metal or plastic, including foams. Many spacers use temperature curable adhesive or sealant layers contacting the panes that, when activated by heating and cooling, will seal the spacer to the glass. Preferably, the spacer integrally contains the sealant or adhesive rather than having a layer on the spacer. A temporary opening is located in the spacer or a spacer gap is provided to later introduce gas and vent air from the air space. Any vents or gaps will be sealed upon completion of the process.

Radiant, convection, or conduction heat applied to the spacer or glass initiates activation of the sealant, forming a bond between the glass panes and the spacer upon cooling.

Immediately after proper adhesive or sealant activation temperature is achieved, cool gas is introduced) into the air space to force cool the spacer to proper temperature, completing the activation cycle and reducing the unit manufacturing time. This gas may be air or inert gas or combinations of gas that provide low heat transfer between separated panes of glass. Releasing compressed gas into the ambient pressure and temperature air space cools the gas that will cool the adhesive or sealant and spacer to the desired temperature. Additional refrigeration to the gas prior to injection may be added to reduce cooling time. The cooling gas may be applied in the air space or applied externally on the glass panes contacting the spacer or on the spacer to forcibly cool the spacer and adhesive or sealant thus reducing the manufacturing time. The sealant is activated by heat and/or cooling.

Preferably, an inert, cool gas is used that will displace the warm air in the air space that escapes from the vents. Measuring the temperature of the vented air is one signal that the air has been displaced. Cool air may also be used to cool units that will use air in the air space of the completed window. The amount of gas entering may also be metered to show the proper amount for a predetermined air space volume. If inert gas is injected, oxygen sensors on the exhaust vents may also be used to show replacement of air in the air space is complete. The vents are sealed after the air space is determined to be properly filled and proper temperature achieved. The unit must be cool prior to transport or installation to prevent failure during transit or after installation in warm or cold conditions.

Accordingly, the object of the invention is to provide a rapid method and apparatus to manufacture multi-pane insulating windows for immediate installation.

Another object of the invention is to provide cooling to multi-pane insulating windows to rapidly complete the spacer sealant or adhesive activation process.

Another object of the invention is to use the air space filling gas for cooling the multi-pane window spacers to complete activation of the spacer sealant.

Another object of the invention is to eliminate the use of vacuum to remove air in an air space prior to filling with, insulating gas.

DETAILED DESCRIPTION OF THE PREFERRED EMBODIMENT

Figure 1:
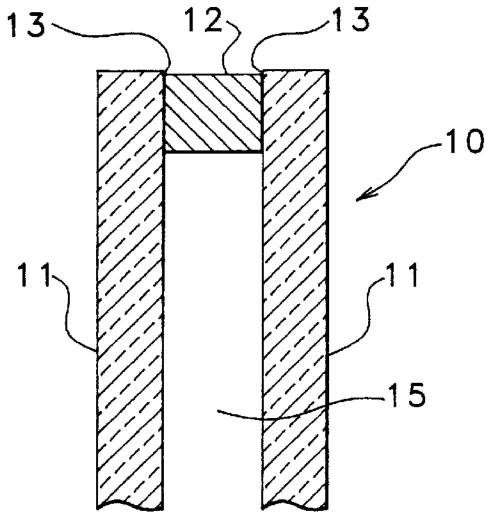
FIG. 1 shows a cross section of a typical edge of a multi-pane insulating glass with spacer and adhesive or sealant.

Referring to the drawings, FIG. 1 shows a cross section of a typical edge of a multi-paned insulated glass window 10 having panes 11 that are glass and a spacer 12. A thin layer of adhesive or sealant 13 is applied between the spacer and glass panes that is activated by heating and cooling to form a bond between the glass panes 11 and the spacer 12. The spacer 12 may have the adhesive or sealant integrally included in the spacer so a separate layer of adhesive or sealant may not be necessary.

The definition glass includes various types of glass such as tempered or regular, colored, coated, laminated, or annealed and also plastic surfaces that serve the same purpose as windows. The glass panes may be multi-sided, rounded, or combinations of shapes that result in essentially the same shape for each pane. Normally two or three panes are used in an assembly but more are possible.

The spacer 12 can be made from various materials and in different shapes or profiles that separate the glass panes. The materials can be metal or plastic, or from combinations of metal and plastic, including foams. The plastic materials may be thermoplastic or thermosetting, flexible or rigid; hollow, foam, or solid. Some of these spacers are described in the patents stated in the prior art. The spacer is normally placed near or on the periphery of the panes and separates the panes providing an air space 15 between panes. A preferred spacer is Swiggle® made by Tremco, Beachwood, Ohio 44122. This spacer contains the sealant and does not need a separate sealant or adhesive layer.

FIG. 1 shows a thin layer of adhesive or sealant 13 applied between the spacer and glass panes. This adhesive or sealant layer may be liquid, emulsion, plastisols, tape, and is usually polymeric. The adhesive or sealant is activated by heat and bonds the spacer to the panes forming a hermetic seal. Heating the adhesive or sealant can be accomplished by radiant, convection, or conduction methods, some of these heating methods are described in the prior art patents. The adhesives or sealant include heat activated polyurethanes, silicones, neoprenes (chloroprene), butyls and chlorobutyls, silanes, epoxies, polyacrylics, polyisobutylenes, and polysulfides. The sealant or adhesives are activated by heat and/or cooling.

Figure 2:
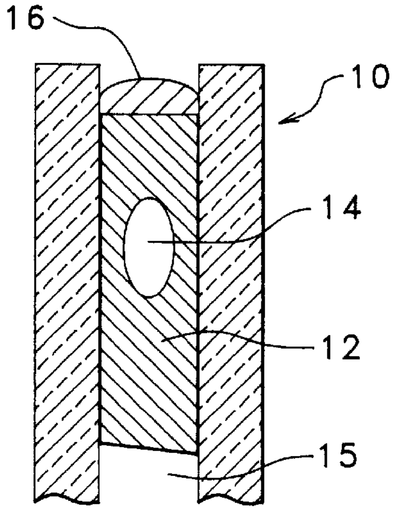
FIG. 2 shows a section of a spacer that has vent holes.

FIG. 2 shows a section of the spacers having a vent opening 14 that may be any shape and size. This opening allows air from the air space volume to escape when cool gas is injected into the air space. The opening may allow insertion of a wand or wands 27 (FIG. 4) to the lower sections of the air space so cool gas can be inserted into a desired location in the air space. The sealant or adhesive layer 13 is part of the spacer in FIG. 2. For many assemblies a sealant layer 16 may be applied external of the spacer around the entire periphery of the assembly to provide a secure sealing of the assembly.

Figure 3:
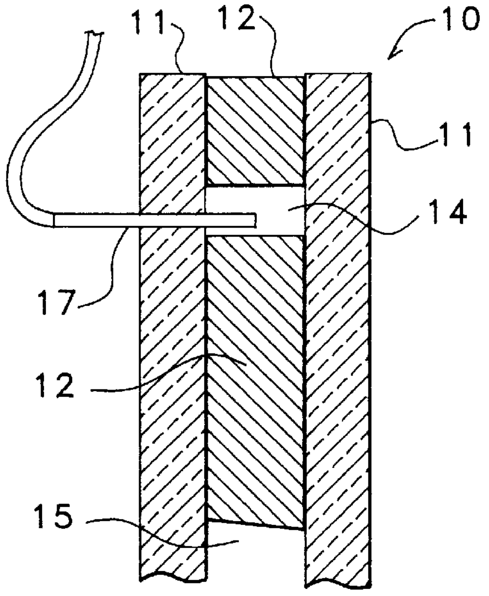
FIG. 3 shows a corner section of a spacer with corner gaps for vents.

FIG. 3 shows an option of openings 14 on the corners of the spacers that serve the same purpose as the openings in the spacers. These openings are sealed as the final step of the manufacturing process.

The manufacturing process includes providing an assembly of at least two glass panes of similar size, spaced essentially in parallel relation to each other. The panes may be supported horizontal, vertical, or placed at an angle. Preferably, the panes are supported vertically with the vents in an upper position so the warmer air space air rises to the vent as cool gas fills the lower air space 15. The spacer is positioned on or near the periphery of panes defining an enclosed air space between said panes except for the opening 14. The adhesive or sealant may be on the spacer prior to placement or applied after placement or be integral with the spacer. Another option would be to coat the glass pane periphery with adhesive or sealant prior to placement of the spacer or any combination of the above adhesive or sealant placement techniques. Clamps or pressures devices can be used to maintain the position of the panes on the spacers during the process if desired.

The preferred heating method is warming the spacers or the glass contacting the spacers and starting the adhesive or sealant curing by convection heating, although conduction, radiation, or microwave heating may also be used. Heaters are placed near the spacers or glass contacting the spacers. Temperatures and times are monitored to provide the fastest and most reliable activation conditions. The adhesive or sealant may also be applied hot on the spacers. The glass panes are then positioned on the spacers and cool gas is applied to cool the sealant that completes the activation process of the sealant or adhesive.

Immediately after the optimum adhesive or sealant heating temperature conditions are accomplished, cool gas in injected into the air space. An alternative process is to apply the cool gas externally on the glass near the spacers or on the spacers rather than into the air space. To achieve the rapid cooling cycle, the assembly of glass panes with spacer with heated adhesive can be placed in a refrigerator for rapid cooling of the heated sealant or adhesive. The ambient cool air in the refrigerator accelerates the rapid manufacturing of the assembly in the same manner as using compressed cool gas to rapidly cool the sealant or adhesive.

Figure 4:
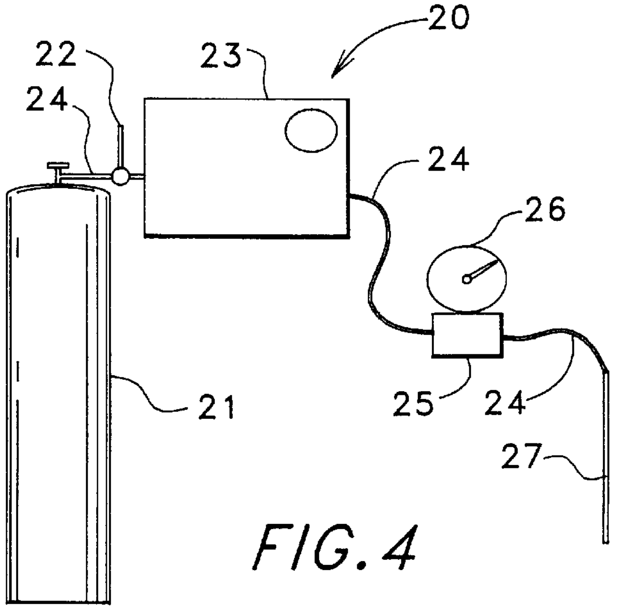
FIG. 4 shows a schematic drawing of the gas cooling apparatus.

FIG. 4. is a schematic of the cooling apparatus 20. The gas is supplied under pressure from a storage tank 21 or an oilless air compressor (not shown) to supply gas under pressure and flows through a containing conduit 24, constructed from plastic and/or metal tubing or pipe, either rigid or flexible, to gas quantity controls and indicators 22. A refrigeration device 23 can add additional cooling to the gas that flows in containment 24 to a control valve 25 such as a solenoid that can be wired to a timer 26. The amount of cool gas that displaces the air in the air space can be metered with this device. The control valve may also be placed after a timer or any position after the storage tank. A means for directing the cool compressed gas between the panes of glass such as a wand 27 or conduit is inserted into the opening 14 to direct the cool gas to the desired areas or applied externally to the glass contacting the spacers. This cooling can also be preprogrammed to be automatic. As the compressed gas exits the wand, additional cooling occurs due to expansion of the gas and this aids in cooling the adhesive or sealant and spacer.

The displacement of the air in the air space can also be monitored by measuring and controlling the cool gas rate into the air space. If the volume of the air space is known, correct amounts of cool gas can be injected to displace the air. Another method of determining the displacement of the air in the air space is measuring the displaced air temperature as it exits the vent. The displacement will be complete when the temperature measuring device 17, shown in FIG. 3, indicates cool temperatures. When the discharge air is cool, the filing is complete. The temperature measuring devices include thermocouples, thermopiles, thermometers, or radiant heat measuring devices.

The cooling gas can be any gas that insulates to reduce or inhibit heat transfer or sound between glass panes. Air and/or nitrogen can be used. Other gasses that are inert and commonly used include argon, sulfur hexafluorid, krypton, fluorocarbons, and blends of these gasses.

The openings 14 are then sealed using sealant materials previously mentioned or any materials that contain the inert gas, air, or nitrogen between the panes. The assembly is ready for shipping and installation.

Example 1: Two panes of rectangular shaped glass measuring 30"×30" using Swiggle® spacers containing sealant, spaced apart 0.5" were assembled as described above. Heat was then applied to reach 120 degrees Fahrenheit spacer temperature. The time was noted. Cool, refrigerated argon gas at approximately 45 degrees F. was then injected between the panes of glass until the ejected gas mix measured 72 degrees F. The unit was then sealed and the time again noted. The adhesive cooling time was 4 minutes compared to the normal 180 minutes adhesive cooling time in ambient air, the cooling method commonly used during normal multi-pane assembly manufacture.

From the above description of the invention, various changes and modifications to the process will occur to those skilled in the art. All such modifications coming from within the scope of the original or amended claims are intended to be included therein.

I claim:

1. A method for rapid manufacturing multi-pane insulating glass windows comprising:

(a) providing as assembly of at least two glass panes of similar size, spaced essentially in parallel relation to each other, separated by a spacer near the periphery of said glass panes and defining an air space between said panes, (b) said spacer having a sealant, activated by heating and set by cooling, contacting said panes, (c) providing heat to activate said sealant to form a seal between said panes and spacer, (d) introducing compressed gas into said air space, said gas being at a temperature less than the temperature of the heated sealant whereby said sealant and said assembly are cooled by said compressed gas displacing the air in said air space while venting said compressed gas from said air space to rapidly form a sealed bond between said panes and spacer and, (e) sealing said compressed gas.

2. The method for rapid manufacturing multi-pane insulating glass windows as stated in claim 1 wherein said compressed gas is a gas selected from the group consisting of air, nitrogen, argon, sulfur hexafluorid, krypton, and fluorocarbons.

3. The method for rapid manufacturing multi-pane insulating glass windows as stated in claim 1 further comprising measuring temperature of the air space air during compressed gas introduction.

4. A method for rapid manufacturing multi-pane insulating glass windows comprising:

(a) providing an assembly of at least two glass panes of similar size, spaced essentially in parallel relation to each other, separated by a spacer near the periphery of said glass panes and defining an air space between said panes, (b) said spacer having a sealant, activated by heating and set by cooling, contacting said panes, (c) providing heat to activate said sealant to form a seal between said panes and spacer, (d) introducing refrigerated gas on exterior of said assembly glass panes whereby said sealant is cooled to rapidly form a sealed bond between said panes and spacer for sealing said assembly.

5. The method for rapid manufacturing multi-pane insulating glass windows as stated in claim 4 further comprising placing an inert gas in said air space between panes before the step of sealing said assembly.

6. A method for rapid manufacturing multi-pane insulating glass windows comprising:

(a) providing an assembly of at least two glass panes of similar size, spaced essentially in parallel relation to each other, separated by a spacer near the periphery of said glass panes and defining an air space between said panes, (b) said spacer having a sealant, activated by heating and set by cooling, contacting said panes, (c) providing heat to activate said sealant, (d) introducing refrigerated compressed gas into said air space whereby said sealant and said assembly are cooled by said compressed gas displacing the air in said air space and, (e) sealing said compressed gas.

7. A method for rapid manufacturing multi-pane insulating glass windows comprising:

(a) providing an assembly of at least two glass panes of similar size, spaced essentially in parallel relation to each other, separated by a spacer near the periphery of said glass panes and defining an air space between said panes, (b) said spacer having a sealant, activated by heating and set by cooling, contacting said panes, (c) providing heat to activate said sealant, (d) introducing refrigerated gas on exterior of said assembly glass panes whereby said sealant is cooled, (e) sealing said assembly, and (f) refrigerating said compressed gas.

8. A method for rapid manufacturing multi-pane insulating glass windows comprising:

(a) providing an assembly of at least two glass panes of similar size, spaced essentially in parallel relation to each other, separated by a spacer near the periphery of said glass panes and defining an air space between said panes, (b) said spacer having a sealant, activated by heating and set by cooling, contacting said panes, (c) providing heat to activate said sealant to form a seal between said panes and said spacer, and (d) cooling said heated sealant to rapidly complete the setting of said sealant.

9. The method as set forth in claim 8 wherein said cooling is by blowing a gas over the exterior of said assembly, said gas being at a temperature below the temperature of said heated sealant.

10. The method as set forth in claim 8 wherein said cooling is by introducing compressed gas into said air space, said compressed gas being at a temperature below the temperature of said heated sealant.

11. The method as set forth in claim 8 wherein said cooling is by refrigerating said assembly.

* * * * *